June 30, 1970  E. F. FLORIAN  3,518,677
ELECTRIC MARINE CABLE
Filed Sept. 16, 1968
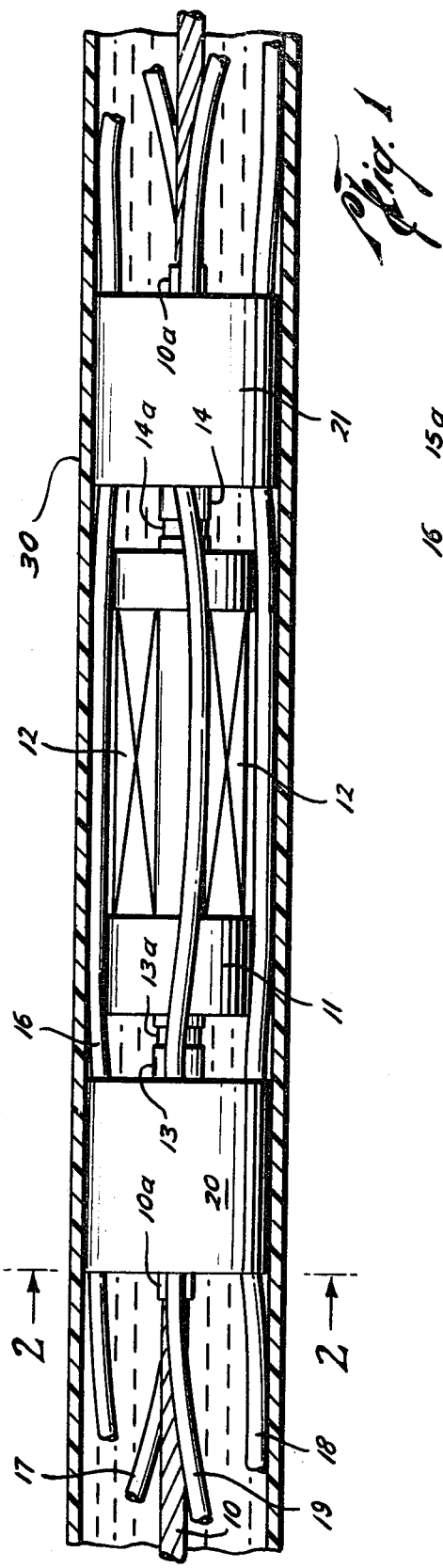
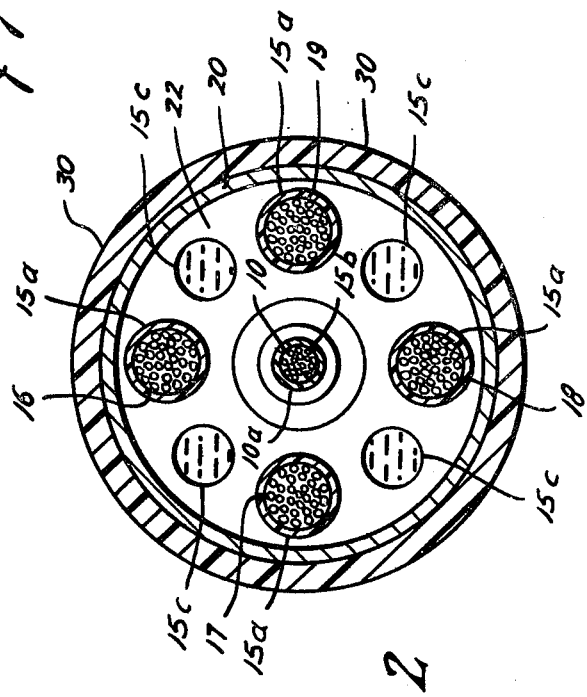
Eugene F. Florian
INVENTOR.
BY
Browning, Hoyer, Eickenroht & Thompson
ATTORNEYS United States Patent Office 3,518,677
Patented June 30, 1970

3,518,677
ELECTRIC MARINE CABLE
Eugene F. Florian, Houston, Tex., assignor to Mark Products, Inc., Houston, Tex.
Filed Sept. 16, 1968, Ser. No. 762,284
Int. Cl. G01v 1/38
U.S. Cl. 340—7
7 Claims

ABSTRACT OF THE DISCLOSURE

A marine electric cable is disclosed for towing through water for the detection of underwater sound. The cable includes a central core of flexible material to provide the cable with tensile strength. A plurality of sound detectors are spaced along the central core and conductors are provided to connect the sound detectors to a recorder. This assembly is encased in an outer sheath of flexible material, which is filled with a gelatinized material, having good sound transmitting qualities.

---

This invention relates to electric cables generally, and in particular to cables comprising a plurality of conductors enclosed by an outer sheath.

This invention has particular utility in connection with streamer cables that are towed through the water for seismic surveys of underwater earth structures. Streamer cables used for this purpose include a plurality of hydrophones that are spaced along the cable to pick up the sound waves traveling through the water from the earth and to transmit this information to a recorder on the towing ship. Therefore, the cable includes conductors that are connected from the hydrophones to the recorder. All this equipment has to be protected from the water and yet it must be in good acoustic relationship with the water so that sound traveling through the water can be picked up without excessive damping. To protect the instruments, conductors, etc. from the water, the hydrophones and conductors are enclosed in an outer sheath of water tight material. The sheath is filled with a material having good acoustic properties, usually a liquid, to provide a good acoustical connection between the water and the hydrophones inside the sheath. The disadvantage of this arrangement is that should the sheath be torn, or for some reason develops a leak, all of the liquid inside can leak out or conversely water can leak in and either alternative is undesirable.

Therefore, it is an object of this invention to provide an electric cable comprising a plurality of conductors inside an outer sheath in which the outer sheath is completely filled with a material that is liquid when installed, but which will not leak out or permit water to leak into the cable should the outer sheath be torn or otherwise perforated.

It is yet another object of this invention to provide an improved filler for a seismic streamer cable that can be placed inside the outer sheath of the cable as a low viscosity liquid to insure that substantially all of the air is displaced from the outer sheath, after which the filler will gel to provide a filler that will not leak out should the outer sheath be perforated.

It is another object of this invention to provide a method of filling the outer sheath of an electric cable with a gelled liquid.

These and other objects, advantages, and features of this invention will be apparent to those skilled in the art from a consideration of this specification, including the attached drawings and appended claims.

The invention will now be described in detail in connection with the attached drawings in which:

FIG. 1 is a vertical cross-sectional view through a portion of an underwater streamer cable; and
FIG. 2 is a sectional view taken along line 2—2 of FIG. 1.

FIG. 1 is a section through the hydrophone section of a streamer cable. Such sections are spaced along the cable throughout its length. They are connected together and to the boat towing them by flexible central strain member 10 which has sufficient tensile strength to pull the cable and its associated equipment through the water. A flexible multi-strand wire rope or cable is used for this central strain member in the embodiment shown. The strain member is covered by protective or insulating jacket 10a of a material with poor acoustic properties to insulate the hydrophones from vibrations produced by the tow boat and transmitted through the strain member. The jacket is broken away in FIG. 1 to show the strain member.

Hydrophone saddle 11 supports hydrophones 12. Strain member 10 extends through the saddle, which is held in place on the member by sleeves 13 and 14, attached to opposite ends of the saddle, and clamps 13a and 14a.

Hydrophones 12 and the other hydrophones (not shown) that are attached to central member 10 at spaced intervals therealong are connected to a recorder on the tow boat by multiple conductor electric cables 16–19.

Adjacent each end of the hydrophone saddle are spacers 20 and 21. These spacers comprise tubular bodies of rigid material with at least one transverse partition, such as partition 22 of spacer 20 (FIG. 2). The partitions have a plurality of openings 15a, 15b, and 15c. Cables 16–19 pass through openings 15a. The central strain member passes through opening 15b. Openings 15c are to allow the filler material to be discussed below to flow through the partition. It is the purpose of the spacers to keep the conductor cables more or less in their proper orientation and somewhat separated and to keep the strain member approximately in the middle of the cable.

It is also the purpose of the spacers, particularly the outer cylindrical portion, to support cylindrical outer sheath 30, which encloses the assembly of conductors and hydrophones. The outer sheath is made of a material having good acoustic qualities, so that the sound passing through the water will be transmitted through the outer sheath readily and with good quality. Polyvinyl chloride and polyurethane are two materials that can be used for the outer sheath. Both of these materials have good acoustic qualities, although polyurethane is preferred because it does not shield the hydrophones as much as does the polyvinyl chloride. Also, it appears to be a little tougher.

After the cable is assembled with the conductors, hydrophones, etc., enclosed by the outer sheath, the empty space remaining inside the sheath is filled with a material having good acoustic properties to transmit the sound from the sheath to the hydrophones and to support the outer sheath. In accordance with this invention, the outer sheath is filled with a gelatinized liquid. Preferably, the filler has a specific gravity less than water to add buoyancy to the cable and offset the negative buoyancy of the other components of the cable so that the cable has approximately neutral buoyancy. By using a filler having a specific gravity of around 0.8 or slightly below, the cable will approximate neutral buoyancy. The gelatinized filler material should fill the sheath and displace substantially all, if not all, of the air therefrom for air is a relatively poor conductor of sound. This is most easily accomplished if the filler is a liquid of low viscosity when placed in the sheath. Therefore, preferably, the filler will be a low viscosity liquid when installed after which it will gel to provide the filler of this invention.

To fill the cable with the initially liquid filler, the cable is inclined from the vertical and the filler is pumped in the low end. As the liquid filler rises in the cable from the low end of the cable, air is pulled out from the top to help the liquid displace all air from the inside of the outer sheath. After all the air has been displaced from the cable by the liquid filler material, it will gel to form a coagulated mixture of sufficient viscosity that it will resist displacement from the sheath should the sheath be ruptured, but which will not make the cable unduly stiff.

One such material that has been used for this purpose is kerosene mixed with monomers of styrene, which serves as the gelling agent. A gelling agent of this type is sold under the trademark "Lipogel" by the Western Company of Dallas, Tex. This gelling agent and the kerosene are mixed together with about 5% of the total weight of the mixture being gelling agent. With about 5% by weight of gelling agent, the mixture will remain sufficiently liquid long enough for it to be readily pumped into the sheath and to fill all the voids in the sheath. After about 30 minutes, the mixture will gel and remain in the gelled condition indefinitely. Further, with such a mixture, when the kerosene gels, it will remain tacky and workable and can be forced into other shapes without breaking itself into discrete pieces. This gives the gel a self sealing ability which is desirable.

From the foregoing, it will be seen that this invention is one well adapted to attain all of the ends and objects hereinabove set forth, together with other advantages which are obvious and which are inherent to the apparatus and method.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An underwater marine streamer cable for towing through water for the seismic detection of underwater sound comprising a member of flexible material of sufficient tensile strength to pull the cable through the water, a sheath of material with poor acoustic qualities covering the member, a plurality of sound detectors spaced along the member and attached thereto, conductors connected to the sound detectors for conducting signals from the detectors to a recorder, an outer sheath of flexible material with good acoustic properties, and a filler of gelatinized material filling the remaining space in the outer sheath, said filler material having good acoustic qualities and a specific gravity no greater than one to provide buoyancy to the cable.

2. The streamer cable of claim 1 in which the filler is a gelatinized liquid hydrocarbon.

3. The streamer cable of claim 1 in which the filler is a mixture of kerosene and monomers of styrene, with the styrene approximately 5 percent by weight of the mixture.

4. A marine cable for towing through water for seismic detection of underwater sound comprising a strain member of flexible material of sufficient tensile strength to pull the cable through the water, a plurality of transducers spaced along the strain member, conductors connected to the transducers for conducting signals therefrom, an outer sheath of flexible material with good acoustic properties enclosing the strain member, conductors, and transducers and a gelatinated filler material filling the outer sheath, said filler being a liquid of relatively low viscosity when placed inside the sheath to displace substantially all of the air therefrom after which the filler gelatinates.

5. The cable of claim 4 in which the filler includes a liquid hydrocarbon.

6. The cable of claim 4 in which the filler is a mixture of kerosene and monomers of styrene, with the styrene approximately 5 percent by weight of the mixture.

7. The cable of claim 4 further provided with a plurality of spacers located at spaced intervals along the strain member inside the outer sheath to hold the member, conductors, and outer sheath in spaced relationship to each other, said spacers having openings through which the filler can flow as the filler is filling the outer sheath.

References Cited

UNITED STATES PATENTS 3,434,104   3/1969   Stapleton et al. _____ 340—7

RODNEY D. BENNETT, JR., Primary Examiner

D. C. KAUFMAN, Assistant Examiner